(12) United States Patent
Song et al.

(10) Patent No.: US 11,404,076 B2
(45) Date of Patent: Aug. 2, 2022

(54) MAGNETIC RECORDING DEVICES USING VIRTUAL SIDE SHIELDS FOR IMPROVED AREAL DENSITY CAPABILITY

(71) Applicant: Western Digital Technologies, Inc., San Jose, CA (US)

(72) Inventors: Suping Song, Fremont, CA (US); Zhanjie Li, Pleasanton, CA (US); Terence Lam, Cupertino, CA (US); Lijie Guan, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/039,840

(22) Filed: Sep. 30, 2020

(65) Prior Publication Data

US 2021/0074322 A1 Mar. 11, 2021

Related U.S. Application Data

(62) Division of application No. 16/564,704, filed on Sep. 9, 2019, now Pat. No. 10,832,710.

(51) Int. Cl.
*G11B 5/11* (2006.01)
*G11B 5/31* (2006.01)
(Continued)

(52) U.S. Cl.
CPC .............. *G11B 5/315* (2013.01); *G11B 5/012* (2013.01); *G11B 5/02* (2013.01); *G11B 5/1278* (2013.01);
(Continued)

(58) Field of Classification Search
None
See application file for complete search history.

(56) References Cited

U.S. PATENT DOCUMENTS 9,508,364 B1 11/2016 Tang et al.
9,653,101 B1 * 5/2017 Liu .................. G11B 5/235
(Continued)

FOREIGN PATENT DOCUMENTS

CN       104464759 A    3/2015
JP       2007035082 A   2/2007
WO       2018111356 A1  6/2018

OTHER PUBLICATIONS

International Search Report and the Written Opinion for International Application No. PCT/US2020/023709 dated Jul. 10, 2020, 10 pages.

*Primary Examiner* — Jefferson A Evans
(74) *Attorney, Agent, or Firm* — Patterson + Sheridan, LLP; Steven H. Versteeg

(57) ABSTRACT

Embodiments of the present disclosure generally relate to a magnetic media drive employing a magnetic recording device. The magnetic recording device comprises a trailing gap disposed adjacent to a first surface of a main pole, a first side gap disposed adjacent to a second surface of the main pole, a second side gap disposed adjacent to a third surface of the main pole, and a leading gap disposed adjacent to a fourth surface of the main pole. A side shield surrounds the main pole and comprises a heavy metal first layer and a magnetic second layer. The first layer surrounds the first, second, and third surfaces of the main pole, or the second, third, and fourth surfaces of the main pole. The second layer surrounds the second and third surfaces of the main pole, and may further surround the fourth surface of the main pole.

20 Claims, 9 Drawing Sheets

(51) Int. Cl.
  *G11B 5/235* (2006.01)
  *G11B 5/012* (2006.01)
  *G11B 5/127* (2006.01)
  *G11B 5/02* (2006.01)

(52) U.S. Cl.
  CPC .......... *G11B 5/235* (2013.01); *G11B 5/3116* (2013.01); *G11B 5/3133* (2013.01); *G11B 5/3143* (2013.01); *G11B 5/3146* (2013.01); *G11B 5/11* (2013.01)

(56) References Cited

U.S. PATENT DOCUMENTS

| | | |
|---|---|---|
| 10,014,012 B1 | 7/2018 | Song et al. |
| 10,157,632 B1 | 12/2018 | Song et al. |
| 10,181,334 B1 | 1/2019 | Song et al. |
| 10,210,888 B1 | 2/2019 | Li et al. |
| 10,403,309 B2 | 9/2019 | Li et al. |
| 10,410,658 B1 | 9/2019 | Liu et al. |
| 10,714,127 B1* | 7/2020 | Chen ................ G11B 5/3116 |
| 10,714,129 B1* | 7/2020 | Tang ................. G11B 5/115 |
| 10,714,132 B1* | 7/2020 | Chen ................ G11B 5/4826 |
| 10,748,562 B1* | 8/2020 | Chen ................... G11B 5/37 |
| 10,839,831 B1* | 11/2020 | Nguyen ............ G11B 5/3133 |
| 10,891,976 B1* | 1/2021 | Song ................. G11B 5/1278 |
| 10,997,988 B1* | 5/2021 | Le .................... G11B 5/3133 |
| 11,049,513 B1* | 6/2021 | Le ...................... G11B 5/235 |
| 11,056,134 B1* | 7/2021 | Eppler .............. G11B 5/1278 |
| 2013/0057981 A1 | 3/2013 | Urakami et al. |
| 2015/0310881 A1 | 10/2015 | Koui |
| 2016/0064015 A1* | 3/2016 | Rivkin .............. G11B 5/3146 360/46 |
| 2018/0123021 A1 | 5/2018 | Sasaki et al. |
| 2018/0144768 A1 | 5/2018 | Liu et al. |
| 2018/0330748 A1 | 11/2018 | Liu et al. |
| 2019/0147907 A1 | 5/2019 | Li et al. |
| 2019/0244634 A1 | 8/2019 | Goncharov et al. |
| 2019/0259413 A1 | 8/2019 | Le et al. |

* cited by examiner

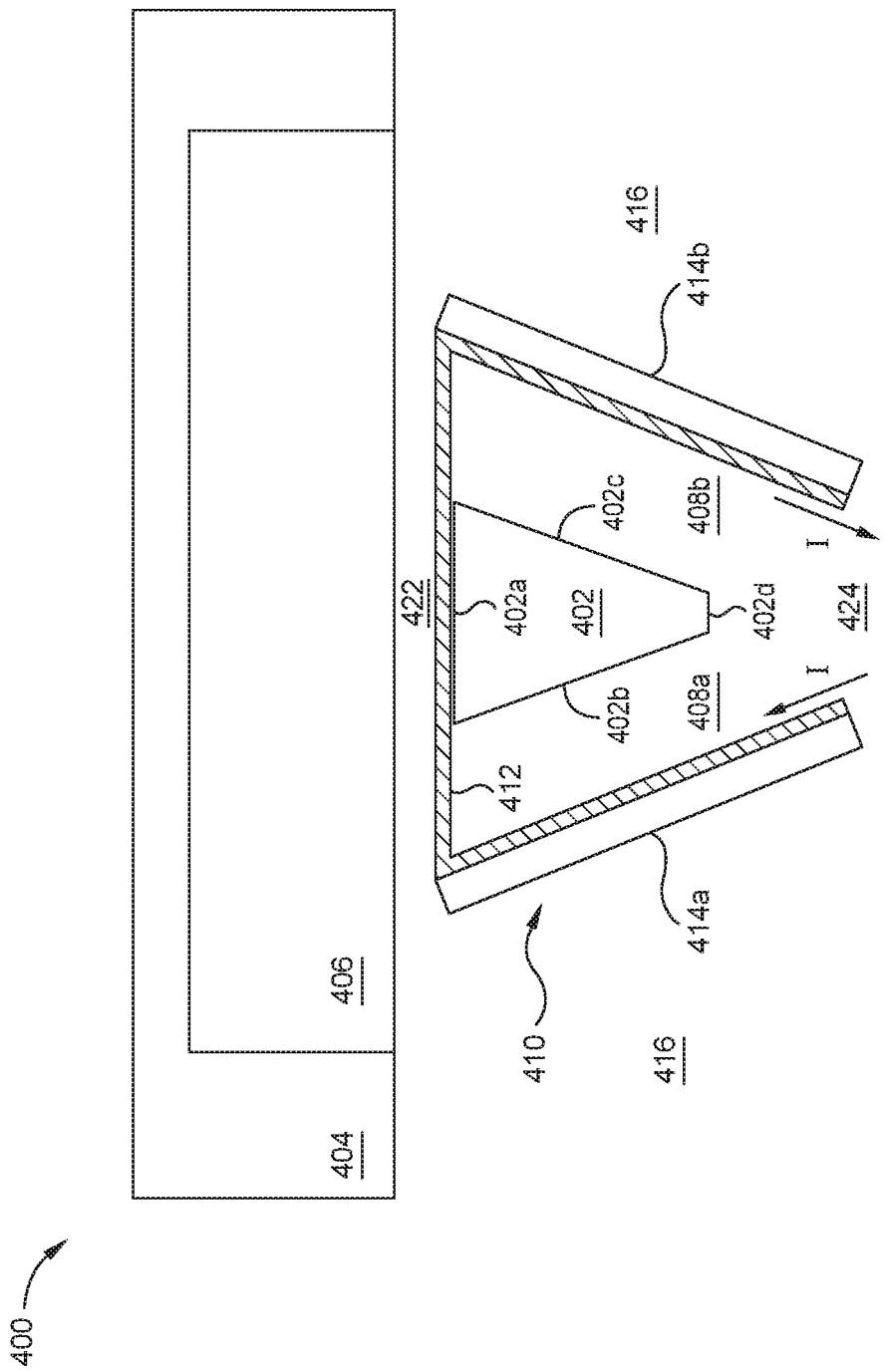

MAGNETIC RECORDING DEVICES USING VIRTUAL SIDE SHIELDS FOR IMPROVED AREAL DENSITY CAPABILITY

CROSS-REFERENCE TO RELATED APPLICATIONS

This application is a divisional of co-pending U.S. patent application Ser. No. 16/564,704, filed Sep. 9, 2019, which is herein incorporated by reference.

BACKGROUND OF THE DISCLOSURE

Field of the Disclosure

Embodiments of the present disclosure generally relate to data storage devices, and more specifically, to a magnetic media drive employing a magnetic recording device.

Description of the Related Art

Over the past few years, energy assisted magnetic recording (EAMR) has been studied as a recording method to improve the areal density of a magnetic read/write device, such as a hard disk drive (HDD). EAMR enabled magnetic recording devices utilize an EAMR stack including at least one magnetic layer, such as a spin torque layer (STL), that is magnetized by a bias current during operation. The EAMR stack is often disposed between the trailing shield and the main pole to improve write field and/or field gradient, leading to better areal density capability (ADC).

Typical EAMR enabled magnetic recording devices further comprise a main pole surrounded by one or more side shields. However, due to the charges coming off of the main pole when a write current is applied to write to a media, adjacent tracks on the media may be erased. As such, the side shields are used for reducing the erasure in adjacent tracks and for further improving the tracks per inch (TPI) performance. On the other hand, the side shields cause magnetic shunting in the side gaps of the magnetic recording device, reducing the bits per inch (BPI) of the magnetic recording devices.

Therefore, there is a need in the art for an improved magnetic recording device design to reduce the erasure in adjacent tracks and to prevent shunting of the magnetic flux in the main pole.

SUMMARY OF THE DISCLOSURE

Embodiments of the present disclosure generally relate to a magnetic media drive employing a magnetic recording device. The magnetic recording device comprises a trailing gap disposed adjacent to a first surface of a main pole, a first side gap disposed adjacent to a second surface of the main pole, a second side gap disposed adjacent to a third surface of the main pole, and a leading gap disposed adjacent to a fourth surface of the main pole. A side shield surrounds the main pole and comprises a heavy metal first layer and a magnetic second layer. The first layer surrounds the first, second, and third surfaces of the main pole, or the second, third, and fourth surfaces of the main pole. The second layer surrounds the second and third surfaces of the main pole, and may further surround the fourth surface of the main pole.

In one embodiment, a magnetic recording device comprises a main pole having a first surface adjacent to a trailing gap, a second surface adjacent to the first surface, a third surface opposite the second surface, and a fourth surface adjacent to a leading gap, and a side shield surrounding one or more of the first surface, the second surface, the third surface, and the fourth surface of the main pole, including at least one of the second surface and the third surface, wherein the side shield comprises a first layer comprising a heavy metal material, and a second layer comprising a magnetic material, wherein the second layer has a greater thickness than the first layer, and wherein the first layer and the second layer have a total thickness between about 2 nm to about 20 nm.

In another embodiment, a magnetic recording device comprises a main pole having a first surface adjacent to a trailing gap, a second surface adjacent to the first surface, a third surface opposite the second surface, and a fourth surface adjacent to a leading gap, a trailing shield disposed adjacent to the trailing gap, and a side shield comprising a first layer surrounding the first surface, the second surface, and the third surface of the main pole, and a second layer surrounding the second surface and the third surface of the main pole.

In yet another embodiment, a magnetic recording device comprises a main pole having a first surface adjacent to a trailing gap, a second surface adjacent to the first surface, a third surface opposite the second surface, and a fourth surface adjacent to a leading gap, a trailing shield disposed adjacent to the trailing gap, one or more side gaps disposed below the trailing shield and surrounding the second and third surfaces of the main pole, and a side shield surrounding the second surface, the third surface, and the fourth surface of the main pole, the side shield comprising a first layer in contact with the one or more side gaps and a second layer in contact with the first layer, wherein the side shield is spaced from the trailing shield and the main pole.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates an MFS view of a magnetic recording device having a virtual side shield, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Embodiments of the present disclosure generally relate to a magnetic media drive employing a magnetic recording device. The magnetic recording device comprises a trailing gap disposed adjacent to a first surface of a main pole, a first side gap disposed adjacent to a second surface of the main pole, a second side gap disposed adjacent to a third surface of the main pole, and a leading gap disposed adjacent to a fourth surface of the main pole. A side shield surrounds the main pole and comprises a heavy metal first layer and a magnetic second layer. The first layer surrounds the first, second, and third surfaces of the main pole, or the second, third, and fourth surfaces of the main pole. The second layer surrounds the second and third surfaces of the main pole, and may further surround the fourth surface of the main pole.

Figure 1:
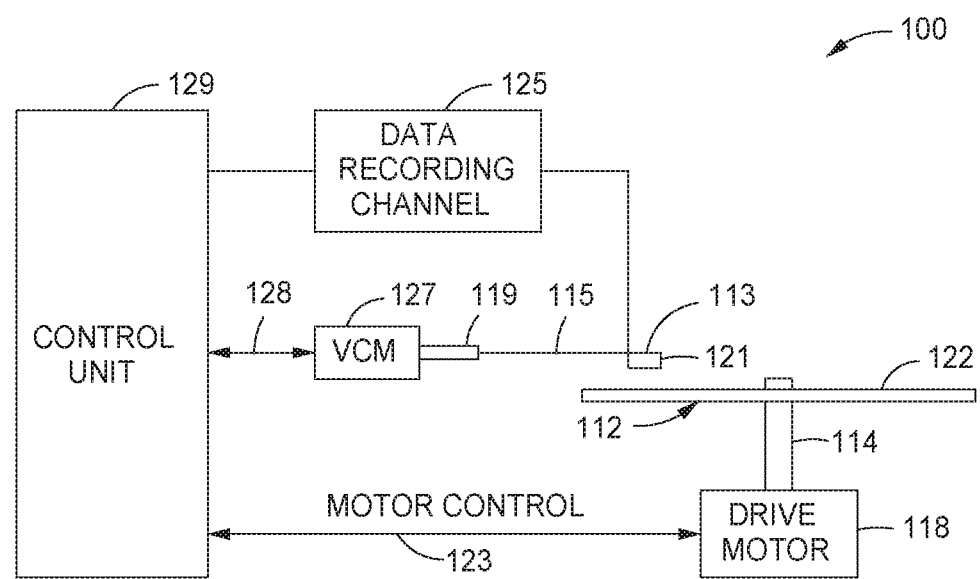
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. The DC magnetic field generated from the magnetic head assembly 121 enhances the write-ability so that the write elements of the magnetic head assemblies 121 may correctly magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
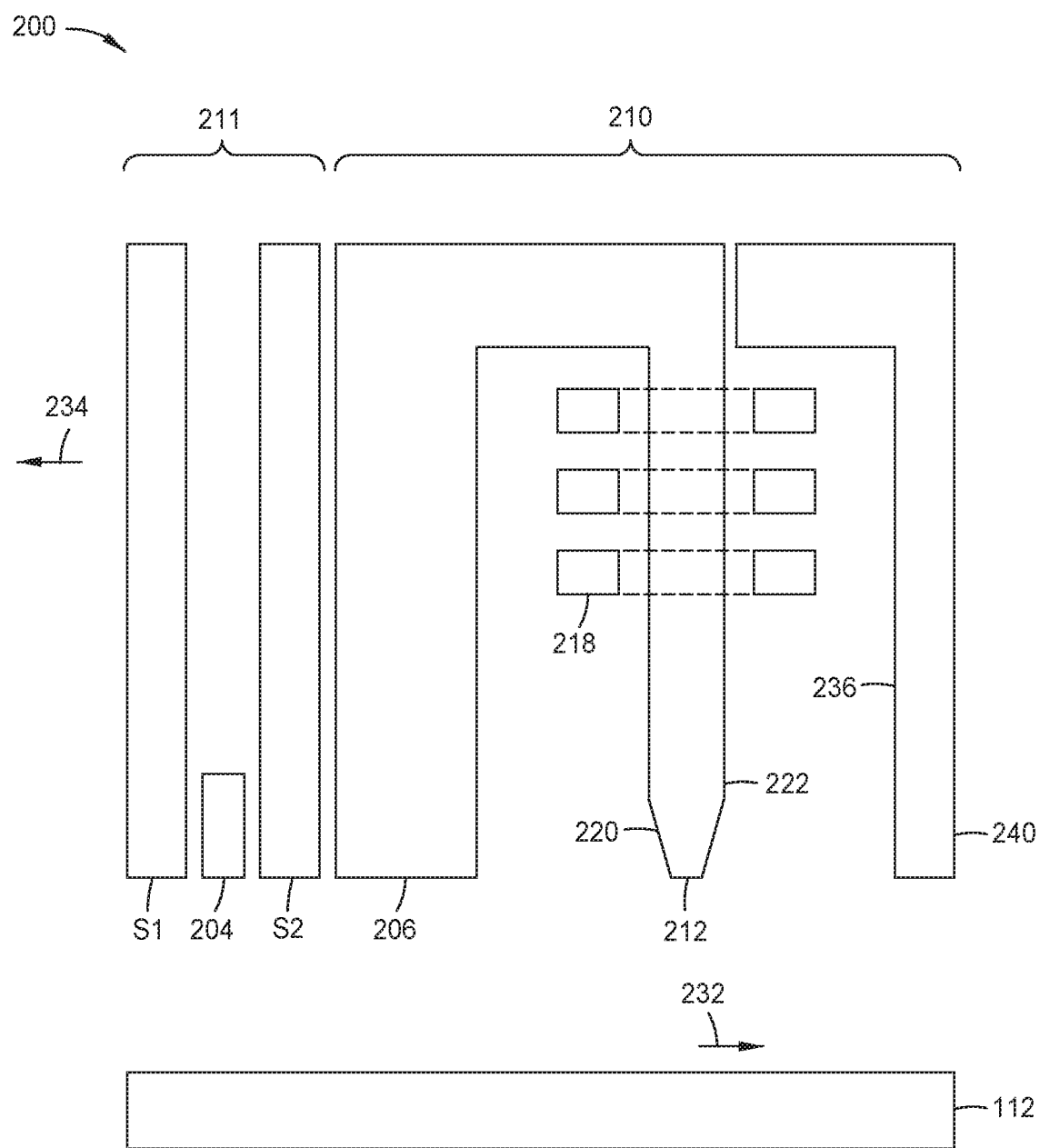
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness between about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

Figure 3:
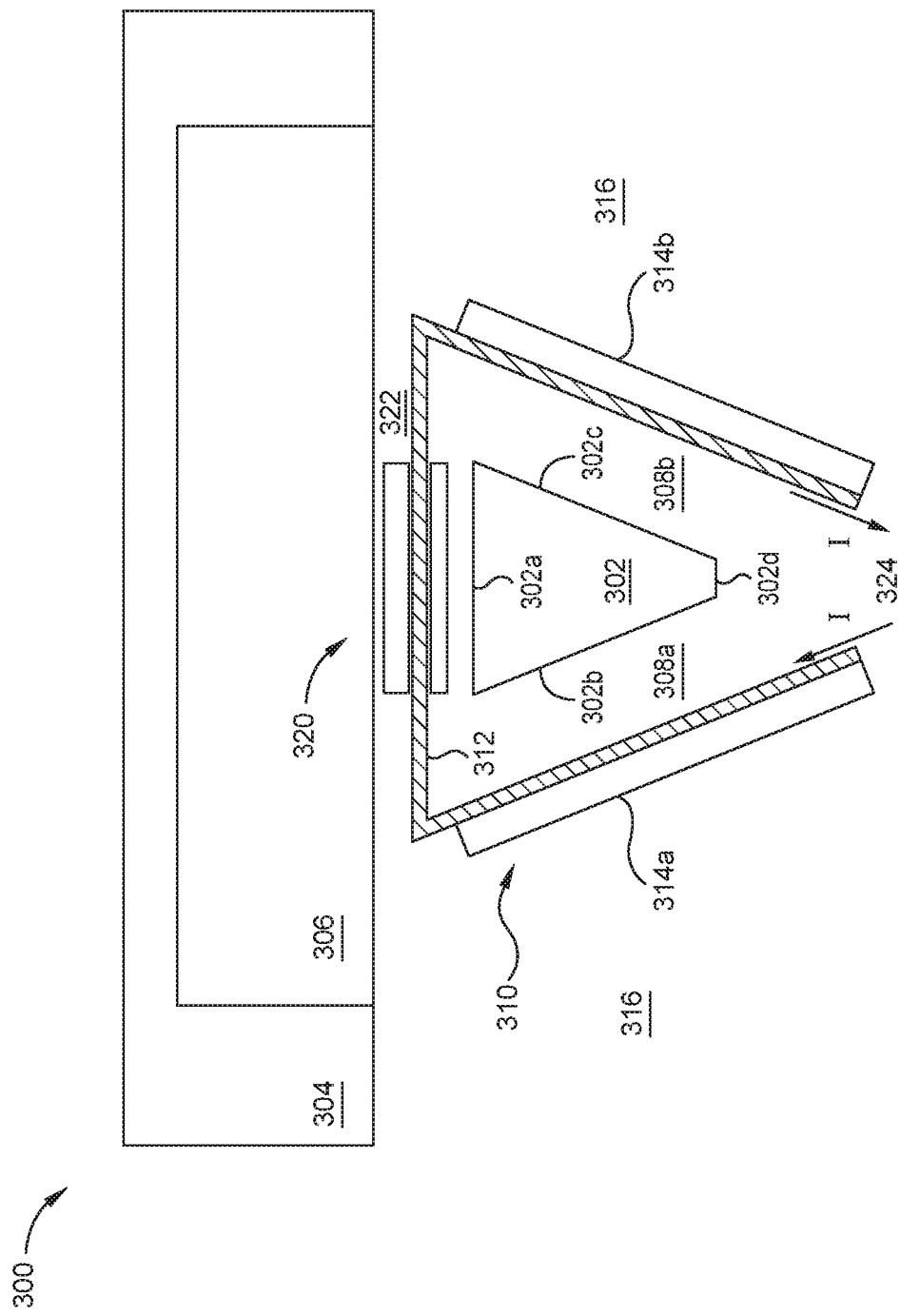
FIG. 3 illustrates an MFS view of a magnetic recording device having a virtual side shield, according to one embodiment.

FIG. 3 illustrates an MFS view of a magnetic recording device 300 having a virtual side shield 310, according to one embodiment. The magnetic recording device 300 may correspond to the magnetic head assembly 121 described in FIG. 1 and/or the read/write head 200 described in FIG. 2. The magnetic recording device 300 comprises a main pole 302, a trailing shield 304 disposed above the main pole 302, and an EAMR stack 320 disposed between the main pole 302 and the trailing shield 304 in a trailing gap 322. The EAMR stack 320 may be a spin orbital torque (SOT) structure. The trailing shield 304 comprises a hot seed layer 306. The trailing shield 304 may comprise NiFe and the hot seed layer 306 may comprise a high moment material, such as CoFeN or FeXN, where X includes at least one of Rh, Al, Ta, Zr, and Ti.

The main pole 302 comprises a first surface 302a, a second surface 302b, a third surface 302c, and a fourth surface 302d. The main pole 302 may comprise fewer or more surfaces, as the main pole 302 may have a different shape. The main pole 302 is surrounded by a trailing gap 322, a leading gap 324, a first side gap 308a, and a second side gap 308b (collectively referred to as side gap 308). The trailing gap 322 is disposed between and in contact with the first surface 302a of the main pole 302 and the trailing shield 304. The leading gap 324 is disposed below and in contact with the fourth surface 302d of the main pole 302. The first side gap 308a is disposed adjacent to and in contact with the second surface 302b of the main pole 302, and the second side gap 308b is disposed adjacent to and in contact with the third surface 302c of the main pole 302.

A virtual side shield (SS) 310 surrounds the first surface 302a, the second surface 302b, and the third surface 302c of the main pole 302. The SS 310 comprises a first layer 312 and a second layer 314. The first layer 312 of the SS 310 surrounds the first surface 302a, the second surface 302b, and the third surface 302c of the main pole 302. The first layer 312 is disposed in the trailing gap 322 between the trailing shield 304 and the main pole 302 and adjacent to the first side gap 308a and the second side gap 308b. The side gap 308 may comprise an insulating material, such as alumina. A portion of the first layer 312 may function as a layer of the EAMR stack 320, or the EAMR stack 320 may be disposed around the first layer 312 in the trailing gap 322.

The second layer 314 of the SS 310 comprises a first portion 314a and a second portion 314b. The first portion 314a of the second layer 314 is disposed adjacent to the first side gap 308a or the second surface 302b of the main pole 302, and the second portion 314b of the second layer 314 is disposed adjacent to the second side gap 308b or the third surface 302c of the main pole 302. The second layer 314 is in contact with the first layer 312, and the first layer 312 is disposed between the second layer 314 and the main pole 302. The second layer 314 has a greater thickness than the first layer 312. The second layer 314 may function as an STL. In the magnetic recording device 300, the SS 310 does not surround the main pole 302 in the leading gap 324. An insulating material 316 may be disposed adjacent to the second layer 314 of the SS 310, such as alumina.

The first layer 312 comprises a heavy metal material, such as beta phase tungsten (β-W), platinum (Pt), or beta phase tantalum (β-Ta). Other heavy metal materials that can be used include Hf, WHf, WIr, TeBiSb, TeBi, TeSb, Bi doped with Cu, FeMn, PfMn, IrMn, and other suitable materials. The first layer 312 may have a thickness between about 1 nm to about 9 nm, such as about 5 nm. The second layer 314 comprises a magnetic material, such as CoFe, CoIr, NiFe, or a CoFeX alloy, where X=B, Ta, Re, or Ir. The second layer 314 may have a thickness between about 2 nm to about 10 nm, such as about 5 nm. The first layer 312 and the second layer 314 of the virtual SS 310 may together have a total thickness between about 6 nm to about 20 nm.

In one embodiment, the first layer 312 may contact the first surface 302a of the main pole 302 (i.e., the trailing side), or a nickel oxide layer may be disposed between the first surface 302a of the main pole 302 and the first layer 312. In another embodiment, an yttrium iron garnet (YIG) layer may be disposed between the first layer 312 and the EAMR stack 320. When current (I) is applied to the magnetic recording device 300, the current flows through the first layer 312 comprising a heavy metal material. Due to the spin hall effect in the first layer 312, the spins accumulated on the surface of the first layer 312 can switch the second layer 314 and the EAMR stack 320. The switching of the virtual SS 310 and the EAMR stack 320 may be controlled by the current magnitude flowing in the first layer 312.

FIG. 4 illustrates an MFS view of a magnetic recording device 400 having a virtual side shield 410, according to one embodiment. The magnetic recording device 400 may correspond to the magnetic head assembly 121 described in FIG. 1 and/or the read/write head 200 described in FIG. 2. The magnetic recording device 400 of FIG. 4 is similar to the magnetic recording device 300 of FIG. 3; however, the magnetic recording device 400 does not comprise an EAMR stack disposed in the trailing gap 422. The magnetic recording device 400 may still comprise an EAMR stack (not shown) or an SOT structure disposed at another location. The magnetic recording device 400 comprises a main pole 402 and a trailing shield 404 disposed above the main pole 402. The trailing shield 404 comprises a hot seed layer 406. The trailing shield 404 may comprise NiFe and the hot seed layer 406 may comprise a high moment material, such as such as CoFeN or FeXN, where X includes at least one of Rh, Al, Ta, Zr, and Ti.

The main pole 402 comprises a first surface 402a, a second surface 402b, a third surface 402c, and a fourth surface 402d. The main pole 402 may comprise fewer or more surfaces, as the main pole 402 may have a different shape. The main pole 402 is surrounded by a trailing gap 422, a leading gap 424, a first side gap 408a, and a second side gap 408b (collectively referred to as side gap 408). The trailing gap 422 is disposed between and in contact with the first surface 402a of the main pole 402 and the trailing shield 404. The leading gap 424 is disposed below and in contact with the fourth surface 402d of the main pole 402. The first side gap 408a is disposed adjacent to and in contact with the second surface 402b of the main pole 402, and the second side gap 408b is disposed adjacent to and in contact with the third surface 402c of the main pole 402.

A virtual SS 410 surrounds the first surface 402a, the second surface 402b, and the third surface 402c of the main pole 402. The SS 410 comprises a first layer 412 and a second layer 414. The second layer 414 has a greater thickness than the first layer 412. The first layer 412 of the SS 410 surrounds the first surface 402a, the second surface 402b, and the third surface 402c of the main pole 402. The first layer 412 is disposed in the trailing gap 422 between the trailing shield 404 and the main pole 402 and adjacent to the first side gap 408a and the second side gap 408b. The side gap 408 may comprise an insulating material, such as alumina.

The second layer 414 of the SS 410 comprises a first portion 414a and a second portion 414b. The first portion 414a of the second layer 414 is disposed adjacent to the first side gap 408a or the second surface 402b of the main pole 402, and the second portion 414b of the second layer 414 is disposed adjacent to the second side gap 408b or the third surface 402c of the main pole 402. The second layer 414 is in contact with the first layer 412, and the first layer 412 is disposed between the second layer 414 and the main pole 402. The second layer 414 may function as an STL. In the magnetic recording device 400, the SS 410 does not surround the main pole 402 in the leading gap 424. An insulating material 416 may be disposed adjacent to the second layer 414 of the SS 410, such as alumina.

The first layer 412 comprises a heavy metal material, such as beta phase tungsten (β-W), Pt, or beta phase tantalum (β-Ta). Other heavy metal materials that can be used include Hf, WHf, WIr, TeBiSb, TeBi, TeSb, Bi doped with Cu, FeMn, PfMn, IrMn, and other suitable materials. The first layer 412 may have a thickness between about 1 nm to about 5 nm, such as about 3 nm. The second layer 414 comprises a magnetic material, such as CoFe, CoIr, NiFe, or a CoFeX alloy, where X=B, Ta, Re, or Ir. The second layer 414 may have a thickness between about 2 nm to about 10 nm, such as about 5 nm. The first layer 412 and the second layer 414 of the virtual SS 410 may together have a total thickness between about 6 nm to about 20 nm.

In one embodiment, the first layer 412 may contact the first surface 402a of the main pole 402 (i.e., the trailing side), or a nickel oxide layer may be disposed between the first surface 402a of the main pole 402 and the first layer 412. When current (I) is applied to the magnetic recording device 400, the current flows through the first layer 412 comprising a heavy metal material. Due to the spin hall effect in the first layer 412, the spins accumulated on the surfaces of the first layer 412 can switch the second layer 414. Additionally, due to the spin hall effect in the first layer 412, the spins accumulated on the surfaces of the first layer 412 can tilt the magnetization direction of the surface of the tip of the main pole 402 (i.e., the first surface 402a) to be pointing less towards the trailing shield 404, which can reduce magnetic flux from the main pole 402 to the trailing shield 404 or increase magnetic flux from the main pole 402 to a media (i.e., increasing the write field). The switching of the virtual SS 410 may be controlled by the current magnitude flowing in the first layer 412.

Figure 5A:
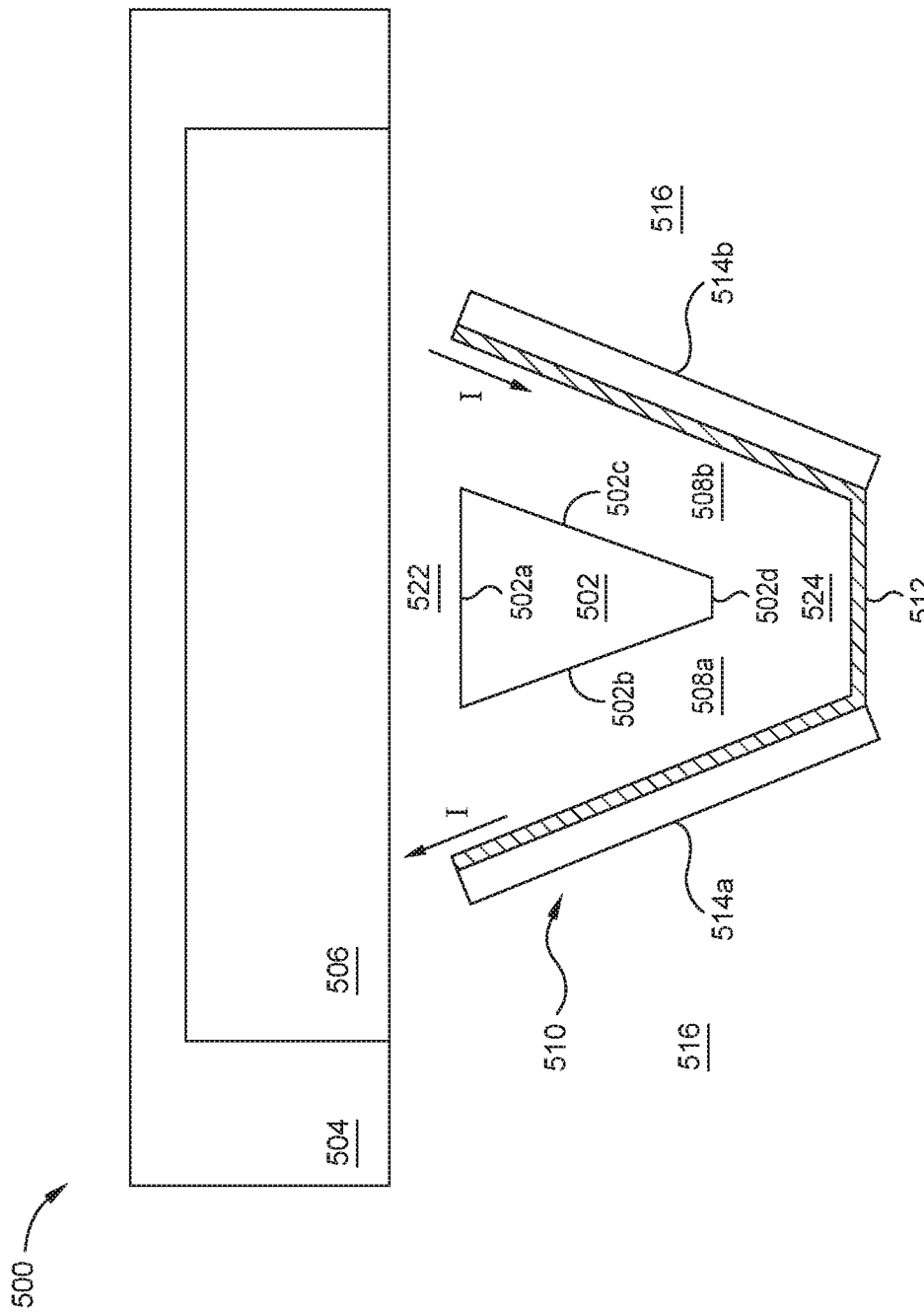
FIGS. 5A-5C illustrate MFS views of magnetic recording devices each having a virtual side shield, according to various embodiments.
Figure 5B:
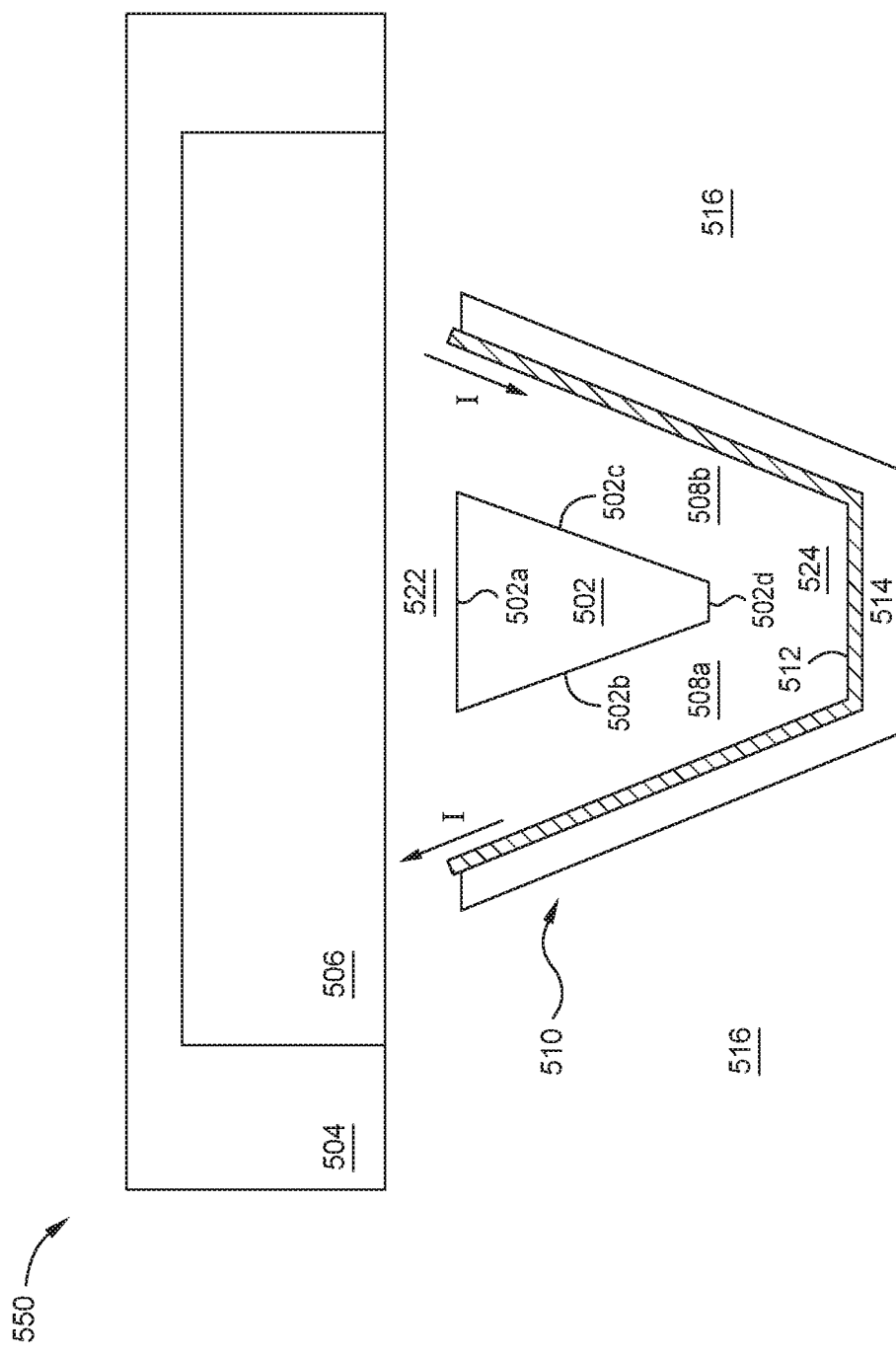
Figure 5C:
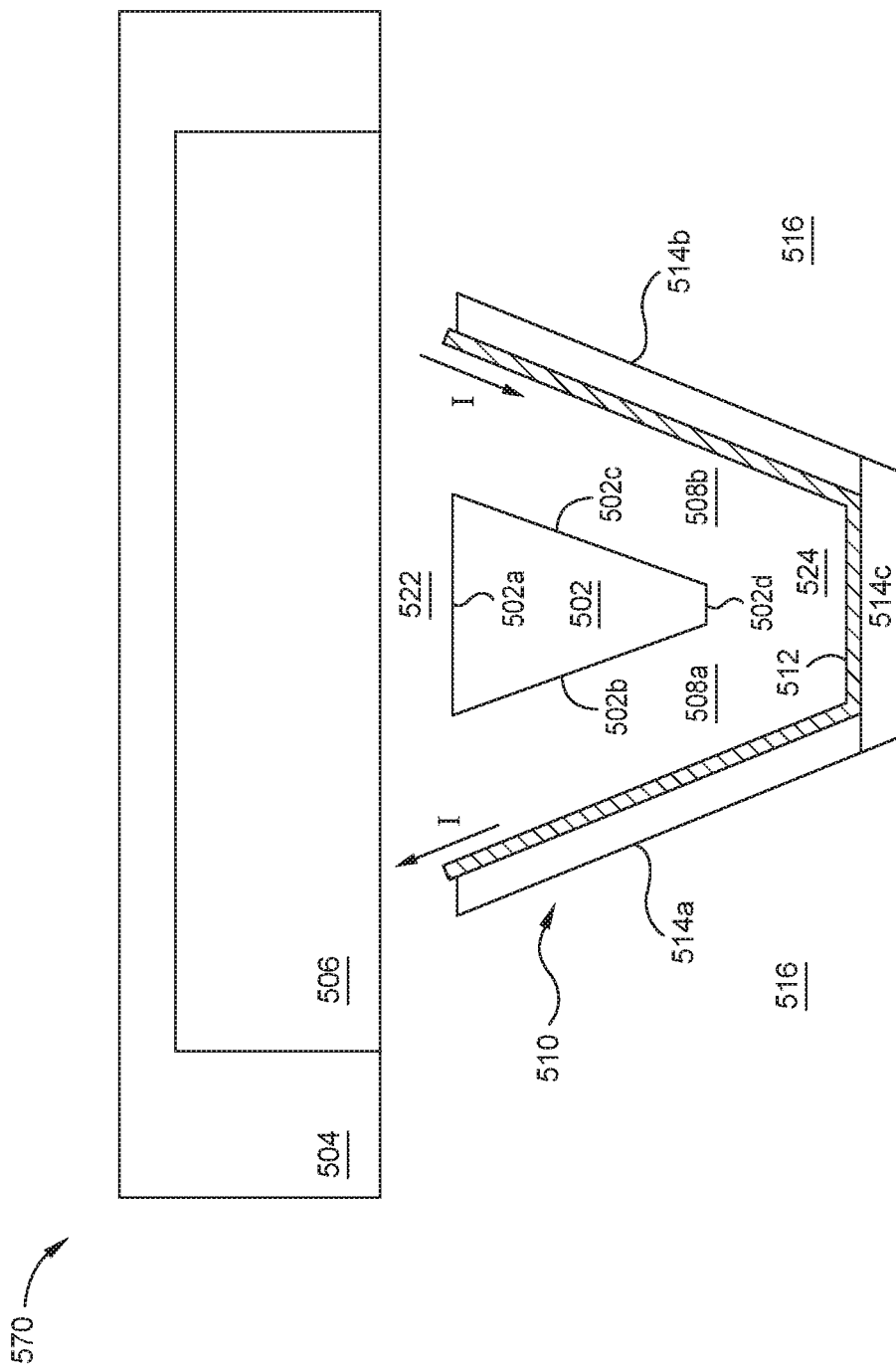

FIGS. 5A-5C illustrate MFS views of magnetic recording devices 500, 550, 570, respectively, each having a virtual side shield 510, according to various embodiments. Each of the magnetic recording devices 500, 550, 570 may individually correspond to the magnetic head assembly 121 described in FIG. 1 and/or the read/write head 200 described in FIG. 2. Each magnetic recording devices 500, 550, 570 comprises a main pole 502 and a trailing shield 504 disposed above the main pole 502. The trailing shield 504 comprises a hot seed layer 506. The trailing shield 504 may comprise NiFe and the hot seed layer 506 may comprise a high moment material, such as such as CoFeN or FeXN, where X includes at least one of Rh, Al, Ta, Zr, and Ti. Each magnetic recording devices 500, 550, 570 may comprise an EAMR stack (not shown) or an SOT structure.

The main pole 502 comprises a first surface 502a, a second surface 502b, a third surface 502c, and a fourth surface 502d. The main pole 502 may comprise fewer or more surfaces, as the main pole 502 may have a different shape. The main pole 502 is surrounded by a trailing gap 522, a leading gap 524, a first side gap 508a, and a second side gap 508b (collectively referred to as side gap 508). The trailing gap 522 is disposed between and in contact with the first surface 502a of the main pole 502 and the trailing shield 504. The leading gap 524 is disposed below and in contact with the fourth surface 502d of the main pole 502. The first side gap 508a is disposed adjacent to and in contact with the second surface 502b of the main pole 502, and the second side gap 508b is disposed adjacent to and in contact with the third surface 502c of the main pole 502.

Each of the magnetic recording devices 500, 550, 570 further comprises a virtual SS 510 surrounding the second surface 502b, the third surface 502c, and the fourth surface 502d of the main pole 502. The SS 510 comprises a first layer 512 and a second layer 514 in contact with one or more surfaces of the first layer 512, and the first layer 512 is disposed between the second layer 514 and the main pole 502. The second layer 514 has a greater thickness than the first layer 512. The second layer 514 may function as an STL. The first layer 512 surrounds the second surface 502b, the third surface 502c, and the fourth surface 502d of the main pole 502. The first layer 512 is disposed in the leading gap 424 and adjacent to the first side gap 508a and the second side gap 508b. The side gap 508 may comprise an insulating material, such as alumina. The SS 510 does not surround the main pole 502 in the trailing gap 522.

In each magnetic recording device 500, 550, 570, the first layer 512 comprises a heavy metal material, such as beta phase tungsten (β-W), Pt, or beta phase tantalum (β-Ta). Other heavy metal materials that can be used include Hf, WHf, WIr, TeBiSb, TeBi, TeSb, Bi doped with Cu, FeMn, PfMn, IrMn, and other suitable materials. The first layer 512 may have a thickness between about 1 nm to about 9 nm, such as about 3 nm to about 5 nm. The first layer 512 and the second layer 514 of the virtual SS 510 may together have a total thickness between about 6 nm to about 20 nm. An insulating material 516 may be disposed adjacent to the second layer 514 of the SS 510, such as alumina.

When current (I) is applied to each of the magnetic recording devices 500, 550, 570, the current flows through the first layer 512 comprising a heavy metal material. Due to the spin hall effect in the first layer 512, the spins accumulated on the surfaces of the first layer 512 can switch the second layer 514. The switching of the virtual SS 510 may be controlled by the current magnitude flowing in the first layer 512.

In the magnetic recording device 500 of FIG. 5A, the second layer 514 comprises a first portion 514a and a second portion 514b. The first portion 514a of the second layer 514 is in contact with the first side gap 508a and disposed adjacent to the second surface 502b of the main pole 502, and the second portion 514b of the second layer 514 is in contact with the second side gap 508b and disposed adjacent to the third surface 502c of the main pole 502. In the magnetic recording device 500, the second layer 514 is not disposed in the leading gap 524 adjacent to the fourth surface 502d of the main pole 502 or in the trailing gap 522 adjacent to the first surface 502a of the main pole 502. Thus, in the magnetic recording device 500, only the first layer 512 is disposed in the leading gap 524.

In the magnetic recording device 500 of FIG. 5A, the first portion 514a and the second portion 514b of the second layer 514 comprise the same material and have the same thickness. The first portion 514a and the second portion 514b of the second layer 514 may each comprise a magnetic material, such as CoFe, CoIr, NiFe, or a CoFeX alloy, where X=B, Ta, Re, or Ir. The first portion 514a and the second portion 514b of the second layer 514 may each have a thickness between about 2 nm to about 10 nm, such as about 5 nm.

In the magnetic recording device 550 of FIG. 5B, the second layer 514 surrounds the second surface 502b, the third surface 502c, and the fourth surface 502d of the main pole 502. The second layer 514 is disposed in the leading gap 524 and adjacent to the first side gap 508a and the second side gap 508b. In other words, the second layer 514 is disposed adjacent to the second surface 502b, the third surface 502c, and the fourth surface 502d of the main pole 502.

In the magnetic recording device 550 of FIG. 5B, the second layer 514 is one continuous layer (i.e., not comprised of portions, or comprised of three portions seamlessly coupled together to form one layer). Thus, in the magnetic recording device 550, the first layer 512 and the second layer 514 both surround the second surface 502b, the third surface 502c, and the fourth surface 502d of the main pole 502. The second layer 514 may comprise a magnetic material, such as CoFe, CoIr, NiFe, or a CoFeX alloy, where X=B, Ta, Re, or Ir. The second layer 514 may have a thickness between about 5 nm to about 12 nm, such as about 10 nm.

In the magnetic recording device 570 of FIG. 5C, the second layer 514 comprises a first portion 514a, a second portion 514b, and a third portion 514c. The second layer 514 in the magnetic recording device 570 of FIG. 5C is discontinuous, as compared to the continuous second layer 514 in the magnetic recording device 550 of FIG. 5B. The first portion 514a of the second layer 514 is disposed adjacent to the first side gap 508a and the second surface 502b of the main pole 502, the second portion 514b of the second layer 514 is disposed adjacent to the second side gap 508b and the third surface 502c of the main pole 502, and the third portion 514c of the second layer 514 is disposed in the leading gap 524 and adjacent to the fourth surface 502d of the main pole 502. Thus, in the magnetic recording device 570, the first layer 512 and the second layer 514 both surround the second surface 502b, the third surface 502c, and the fourth surface 502d of the main pole 502.

In the magnetic recording device 570 of FIG. 5C, the first portion 514a and the second portion 514b of the second layer 514 may comprise the same material while the third portion 514c comprises a different material than the first and second portions 514a, 514b. The first portion 514a and the second portion 514b of the second layer 514 may each comprise a magnetic material, such as CoFe, CoIr, NiFe, or a CoFeX alloy, where X=B, Ta, Re, or Ir. The third portion 514c of the second layer 514 may also comprise a magnetic material, such as CoFe, CoIr, NiFe, or a CoFeX alloy, where X=B, Ta, Re, or Ir, so long as the material of the third portion 514c is different than the material of the first and second portions 514a, 514b. In one embodiment, each of the first, second, and third portions 514a-514c comprise a different magnetic material. The first portion 514a, the second portion 514b, and the third portion 514c of the second layer 514 may each have the same thickness. The first portion 514a, the second portion 514b, and the third portion 514c of the second layer 514 may each have a thickness between about 2 nm to about 10 nm, such as about 5 nm.

Figure 6:
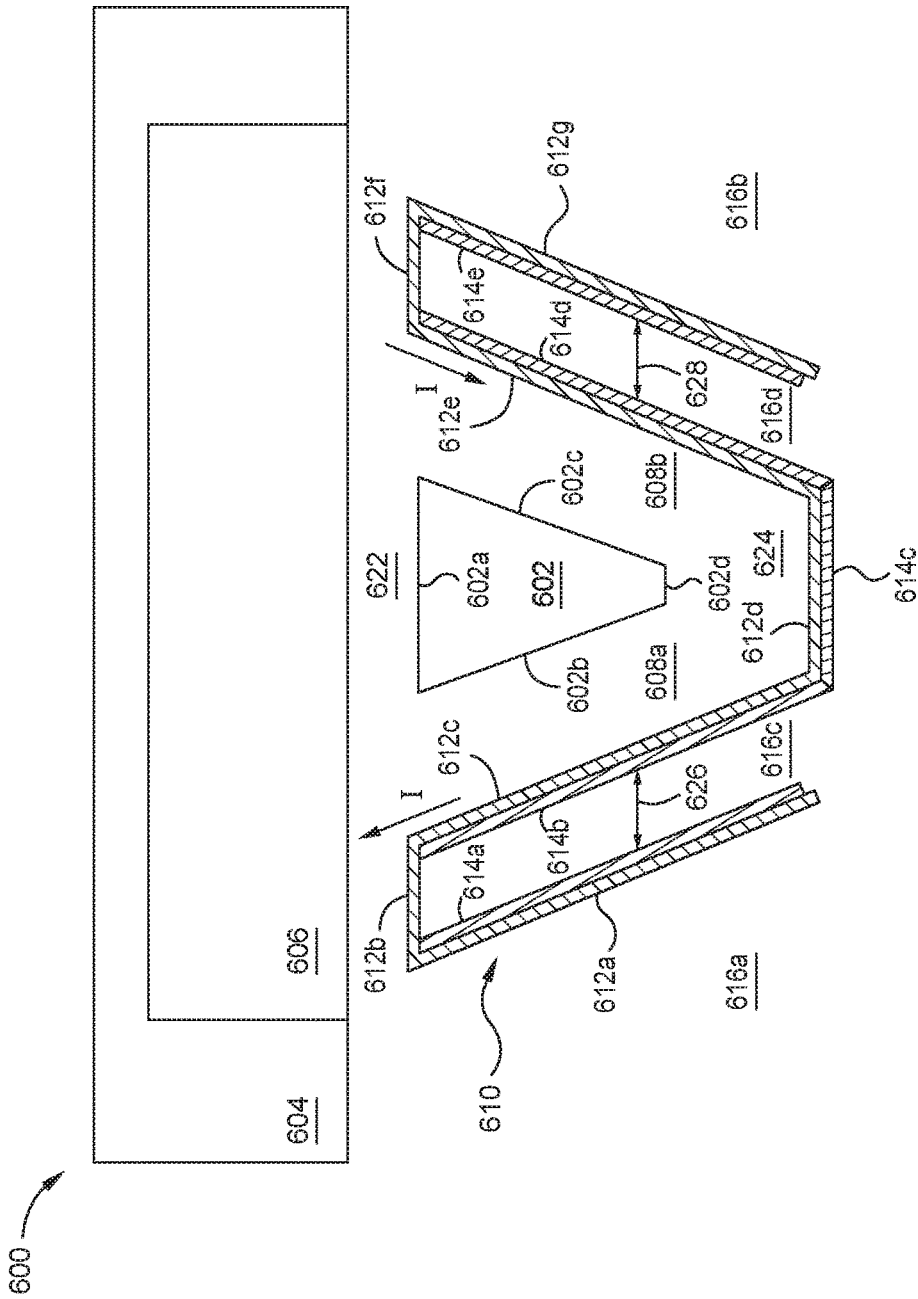
FIG. 6 illustrates an MFS view of a magnetic recording device having a virtual side shield, according to yet another embodiment.

FIG. 6 illustrates an MFS view of a magnetic recording device 600 having a virtual side shield 610, according to one embodiment. The magnetic recording device 600 may correspond to the magnetic head assembly 121 described in FIG. 1 and/or the read/write head 200 described in FIG. 2. The magnetic recording device 600 may comprise an EAMR stack (not shown) or an SOT structure. The magnetic recording device 600 comprises a main pole 602 and a trailing shield 604 disposed above the main pole 602. The trailing shield 604 comprises a hot seed layer 606. The trailing shield 604 may comprise NiFe and the hot seed layer 606 may comprise a high moment material, such as such as CoFeN or FeXN, where X includes at least one of Rh, Al, Ta, Zr, and Ti.

The main pole 602 comprises a first surface 602a, a second surface 602b, a third surface 602c, and a fourth surface 602d. The main pole 602 may comprise fewer or more surfaces, as the main pole 602 may have a different shape. The main pole 602 is surrounded by a trailing gap 622, a leading gap 624, a first side gap 608a, and a second side gap 608b (collectively referred to as side gap 608). The trailing gap 622 is disposed between and in contact with the first surface 602a of the main pole 602 and the trailing shield 604. The leading gap 624 is disposed below and in contact with the fourth surface 602d of the main pole 602. The first side gap 608a is disposed adjacent to and in contact with the second surface 602b of the main pole 602, and the second side gap 608b is disposed adjacent to and in contact with the third surface 602c of the main pole 602. The side gap 608 may comprise an insulating material, such as alumina.

A virtual SS 610 surrounds the second surface 602b, the third surface 602c, and the fourth surface 602d of the main pole 602. The SS 610 comprises a first layer 612 and a second layer 614. The second layer 614 is in contact with the first layer 612, and the first layer 612 is disposed between the second layer 614 and the main pole 602. The second layer 614 has a greater thickness than the first layer 612. The first layer 612 and the second layer 614 of the virtual SS 610 may together have a total thickness between about 2 nm to about 12 nm. The second layer 614 may function as an STL.

The first layer 612 of the SS 610 comprises a first portion 612a, a second portion 612b, a third portion 612c, a fourth portion 612d, a fifth portion 612e, a sixth portion 612f, and a seventh portion 612g (collectively referred to as the first layer 612). The portions 612a-612g of the first layer 612 form one continuous layer. The first portion 612a is disposed adjacent to a first insulating material 616a. The second portion 612b is coupled to the first portion 612a and is disposed adjacent to the trailing gap 622. The third portion 612c is coupled to the second portion 612b and is disposed adjacent to the first side gap 608a. The fourth portion 612d is coupled to the third portion 612c and is disposed adjacent to the leading gap 624. The fifth portion 612e is coupled to the fourth portion 612d and is disposed adjacent to the second side gap 608b. The sixth portion 612f is coupled to the fifth portion 612e and is disposed adjacent to the trailing gap 622. The seventh portion 612g is coupled to the sixth portion 612f and is disposed adjacent to a second insulating material 616b. Together, the first through seventh portions 612a-612g of the first layer 612 are arranged in an inverted "W" shape.

The second layer 614 of the SS 610 comprises a first portion 614a, a second portion 614b, a third portion 614c, a fourth portion 614d, and a fifth portion 614e. The first portion 614a of the second layer 614 is disposed between and in contact with the first portion 612a of the first layer 612 and a third insulating material 616c. The second portion 614b of the second layer 614 is disposed between and in contact with the third portion 612c of the first layer 612 and the third insulating material 616c. The third portion 614c of the second layer 614 is coupled to the second portion 614b of the second layer 614 and is disposed adjacent to the leading gap 624. The fourth portion 614d of the second layer 614 is coupled to the third portion 614c of the second layer 614 and is disposed between and in contact with the fifth portion 612e of the first layer 612 and a fourth insulating material 616d. The fifth portion 614e of the second layer 614 is disposed between and in contact with the seventh portion 612g of the first layer 612 and the fourth insulating material 616d.

The first portion 614a is spaced a first distance 626 from the second portion 614b. The first distance 626 may be about 15 nm to about 25 nm, such as about 20 nm. Thus, the first portion 612a of the first layer 612 is spaced from the third portion 612c of the first layer 612 by the first distance 626 and the first and second portions 614a, 614b of the second layer 614. The fourth portion 614d is spaced a second distance 628 from the fifth portion 614e. The second distance 628 may be about 15 nm to about 25 nm, such as about 20 nm. The first distance 626 may be the same as the second distance 628. The fifth portion 612e of the first layer 612 is spaced from the seventh portion 612g of the first layer 612 by the second distance 628 and the fourth and fifth portions 614d, 614e of the second layer 614.

The first, second, third, and fourth insulating materials 616a, 616b, 616c, 616d may each comprise alumina. The first insulating material 616a may be coupled to the third insulating material 616c in the leading gap 624, and the second insulating material 616b may be coupled to the fourth insulating material 616d in the leading gap 624. The third insulating material 616c may be disposed in the first side gap 608a such that the third insulating material 616c forms a portion of the first side gap 608a. Similarly, the fourth insulating material 616d may be disposed in the second side gap 608b such that the fourth insulating material 616d forms a portion of the second side gap 608b.

The first layer 612 comprises a heavy metal material, such as beta phase tungsten (β-W), Pt, or beta phase tantalum (β-Ta). Other heavy metal materials that can be used include Hf, WHf, WIr, TeBiSb, TeBi, TeSb, Bi doped with Cu, FeMn, PfMn, IrMn, and other suitable materials. The first layer 412 may have a thickness between about 1 nm to about 6 nm, such as about 3 nm. The second layer 614 comprises a magnetic material, such as CoFe, CoIr, NiFe, or a CoFeX alloy, where X=B, Ta, Re, or Ir. The second layer 614 may have a thickness between about 1 nm to about 9 nm, such as about 5 nm. In one embodiment, the third portion 614c of the second layer 614 comprises a different material than the first, second, fourth, and fifth portions 614a, 614b, 614d, 614e. In another embodiment, each portion 614a-614e of the second layer 614 comprises the same material.

When current (I) is applied to the magnetic recording device 600, the current flows through the first layer 612 comprising a heavy metal material. Due to the spin hall effect in the first layer 612, the spins accumulated on the surfaces of the first layer 612 can switch the second layer 614. The switching of the virtual SS 610 may be controlled by the current magnitude flowing in the first layer 612.

Figure 7:
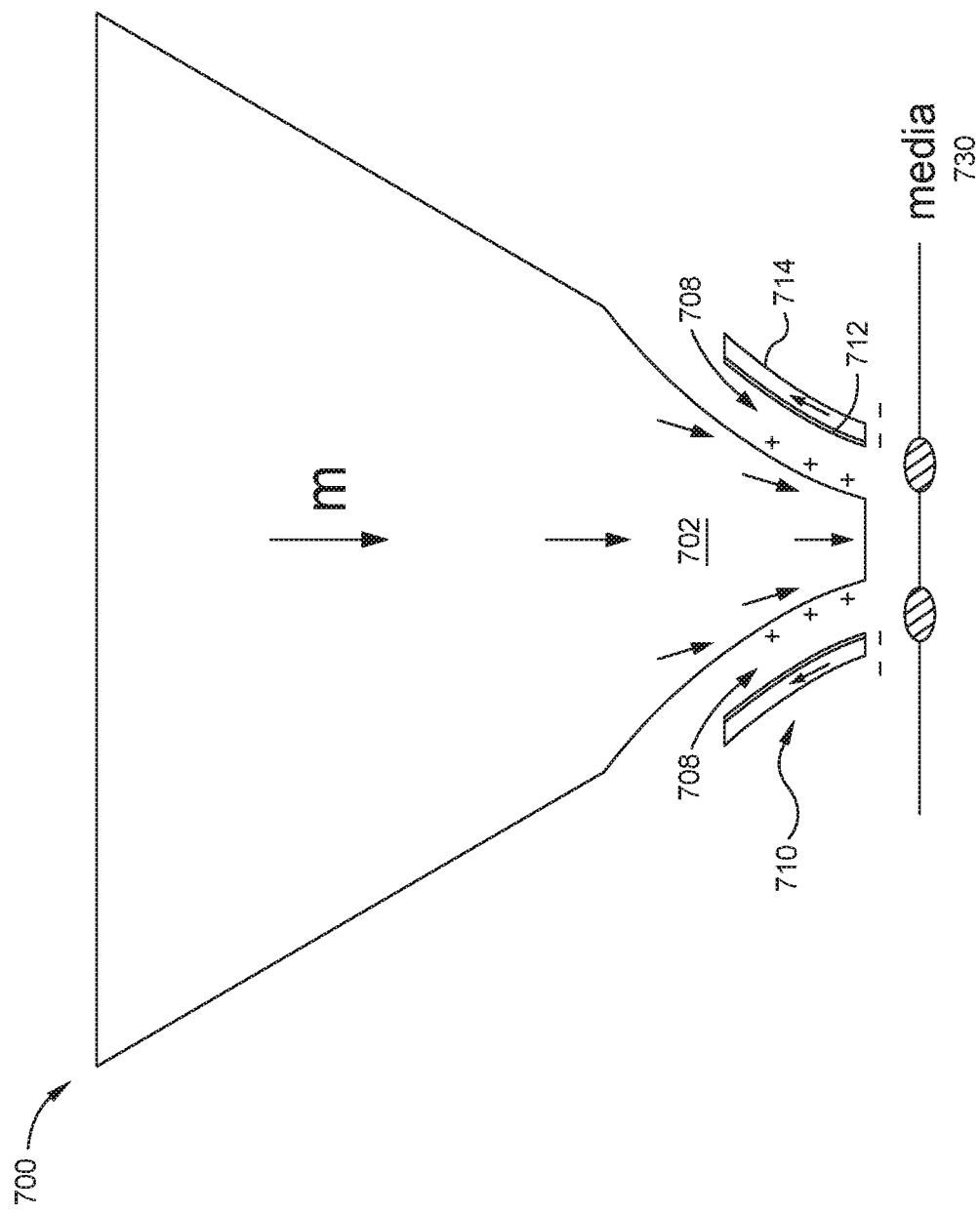
FIG. 7 illustrates a cross-sectional view of a magnetic recording device illustrating the effects of a virtual side shield, according to one embodiment.

FIG. 7 illustrates a cross-sectional view of an exemplary magnetic recording device 700 illustrating the effects of a virtual side shield 710, according to one embodiment. The magnetic recording device 700 may correspond to the magnetic head assembly 121 described in FIG. 1 and/or the read/write head 200 described in FIG. 2. The magnetic recording device 700 may be the magnetic recording device 300 of FIG. 3, the magnetic recording device 400 of FIG. 4, the magnetic recording device 500 of FIG. 5A, the magnetic recording device 550 of FIG. 5B, the magnetic recording device 570 of FIG. 5C, or the magnetic recording device 600 of FIG. 6.

The magnetic recording device 700 comprises a main pole 702 disposed above a media 730 and a virtual SS 710 comprising a first layer 712 and a second layer 714. The virtual SS 710 surrounds at least one surface of the main pole 702. In some embodiments, the virtual SS 710 surrounds at least two surface of the main pole 702. The configuration of the first layer 712 and the second layer 714 of the SS 710 may be like the SS 310 of FIG. 3, the SS 410 of FIG. 4, the SS 510 of FIGS. 5A-5C, or the SS 610 of FIG. 6. The magnetic recording device 700 may comprise other elements not shown in FIG. 7, such as a trailing shield and an EAMR stack.

As shown in FIG. 7, when a bias current is applied to the first layer 712, the second layer 714 can be switched with a magnetization direction opposite to the magnetization direction in the main pole 702. As a result, the charges coming off of the main pole 702 cancel out the charges coming off of the SS 710 at the media 730. Thus, adjacent tracks on the media 730 are no longer erased. Moreover, no magnetic shunting occurs in the side gaps 708. The magnetic recording device 700 has an increased BPI and overwrite capability as compared to conventional magnetic recording devices. The magnetic recording device 700 further experiences a similar TPI and adjacent track interference (ATI) as a conventional magnetic recording device, and has an improved ADC as compare to conventional magnetic recording devices.

Therefore, utilizing a virtual side shield in a magnetic recording device, like shown in FIGS. 3-7, eliminates magnetic shunting and prevents erasure of adjacent tracks on a media when writing to the media. As such, the above-described magnetic recording devices comprising a virtual side shield surrounding two or more surfaces of a main pole have increased ADC, BPI, and overwrite capabilities without sacrificing TPI and ATI capabilities.

In one embodiment, a magnetic recording device comprises a main pole having a first surface adjacent to a trailing gap, a second surface adjacent to the first surface, a third surface opposite the second surface, and a fourth surface adjacent to a leading gap, and a side shield surrounding one or more of the first surface, the second surface, the third surface, and the fourth surface of the main pole, including at least one of the second surface and the third surface, wherein the side shield comprises a first layer comprising a heavy metal material, and a second layer comprising a magnetic material, wherein the second layer has a greater thickness than the first layer, and wherein the first layer and the second layer have a total thickness between about 2 nm to about 20 nm.

The magnetic recording device further comprises a first side gap disposed adjacent to the second surface of the main pole, a second side gap disposed adjacent to the third surface of the main pole, a trailing shield disposed above the first surface of the main pole and the one or more side gaps, a trailing gap disposed between the first surface of the main pole and the trailing shield, and a leading gap disposed adjacent to the fourth surface of the main pole. The first layer of the side shield surrounds the second surface, the third surface, and the fourth surface of the main pole. The second layer of the side shield comprises a first portion disposed adjacent to the first side gap and a second portion disposed adjacent to the second side gap. The first layer is disposed between the first and second side gaps and the second layer. The second layer of the side shield further comprises a third portion disposed adjacent to the leading gap.

The first layer comprises a first portion, a second portion, a third portion, a fourth portion, a fifth portion, a sixth portion, and a seventh portion. The second layer further comprises a third portion, a fourth portion, and a fifth portion. The first layer of the side shield is in contact with the first side gap, the second side gap, and the trailing gap, the first layer surrounding the first surface, the second surface, and the third surface of the main pole. The second layer of the side shield is in contact with the first layer, the second layer comprising a first portion disposed adjacent to the first side gap and a second portion disposed adjacent to the second side gap.

In another embodiment, a magnetic recording device comprises a main pole having a first surface adjacent to a trailing gap, a second surface adjacent to the first surface, a third surface opposite the second surface, and a fourth surface adjacent to a leading gap, a trailing shield disposed adjacent to the trailing gap, and a side shield comprising a first layer surrounding the first surface, the second surface, and the third surface of the main pole, and a second layer surrounding the second surface and the third surface of the main pole.

The first layer comprises beta phase tungsten (β-W), Pt, or beta phase tantalum (β-Ta), and wherein the second layer comprises CoFe, CoIr, NiFe, or a CoFeX alloy where X=B, Ta, Re, or Ir. The first layer has a thickness between about 1 nm to about 9 nm, and the second layer has a thickness between about 2 nm to about 10 nm. The magnetic recording device further comprises an energy assisted-magnetic recording stack disposed between the main pole and the trailing shield.

In yet another embodiment, a magnetic recording device comprises a main pole having a first surface adjacent to a trailing gap, a second surface adjacent to the first surface, a third surface opposite the second surface, and a fourth surface adjacent to a leading gap, a trailing shield disposed adjacent to the trailing gap, one or more side gaps disposed below the trailing shield and surrounding the second and third surfaces of the main pole, and a side shield surrounding the second surface, the third surface, and the fourth surface of the main pole, the side shield comprising a first layer in contact with the one or more side gaps and a second layer in contact with the first layer, wherein the side shield is spaced from the trailing shield and the main pole.

The first layer comprises beta phase tungsten (β-W), Pt, or beta phase tantalum (β-Ta). The first layer has a thickness between about 1 nm to about 9 nm. The second layer comprises CoFe, CoIr, NiFe, or a CoFeX alloy where X=B, Ta, Re, or Ir. The second layer has a thickness between about 2 nm to about 10 nm. The second layer comprises a first portion disposed adjacent to a first side gap of the one or more side gaps and the second surface of the main pole and a second portion disposed adjacent to a second side gap of the one or more side gaps and the third surface of the main pole. The second layer further comprises a third portion disposed adjacent to a leading gap and the fourth surface of the main pole. The third portion of the second layer comprises a different material than the first portion and the second portion of the second layer.

The first layer of the side shield surrounds the second surface, the third surface, and the fourth surface of the main pole. The second layer of the side shield surrounds at least the second surface and the third surface of the main pole. The first layer comprises a first portion, a second portion, a third portion, a fourth portion, a fifth portion, a sixth portion, and a seventh portion. The second layer comprises a first portion, a second portion, a third portion, a fourth portion, and a fifth portion.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording device, comprising:
   a main pole having a first surface adjacent to a trailing gap, a second surface adjacent to the first surface, a third surface opposite the second surface, and a fourth surface adjacent to a leading gap;
   a trailing shield disposed adjacent to the trailing gap; and
   a side shield comprising a first layer surrounding the first surface, the second surface, and the third surface of the main pole, and a second layer surrounding surfaces of the main pole consisting of the second surface and the third surface.

2. The magnetic recording device of claim 1, wherein the first layer comprises beta phase tungsten (β-W), Pt, or beta phase tantalum (β-Ta), and wherein the second layer comprises CoFe, CoIr, NiFe, or a CoFeX alloy, where X=B, Ta, Re, or Ir.

3. The magnetic recording device of claim 1, wherein the first layer has a thickness between about 1 nm to about 9 nm, and the second layer has a thickness between about 2 nm to about 10 nm.

4. The magnetic recording device of claim 1, further comprising an energy assisted-magnetic recording stack disposed between the main pole and the trailing shield.

5. The magnetic recording device of claim 1, wherein the trailing shield comprises NiFe.

6. The magnetic recording device of claim 1, further comprising a hot seed layer disposed between the trailing shield and the trailing gap.

7. The magnetic recording device of claim 6, wherein the hot seed layer comprises a high moment material.

8. The magnetic recording device of claim 7, wherein the high moment material comprises CoFeN or FeXN, where X includes at least one of Rh, Al, Ta, Zr, and Ti.

9. The magnetic recording device of claim 1, wherein the first layer contacts the first surface.

10. The magnetic recording device of claim 9, wherein the first layer is spaced from the second surface and the third surface.

11. A data storage device comprising the magnetic recording device of claim 1.

12. The magnetic recording device of claim 1, wherein when a bias current is applied to the first layer, a magnetization direction of the second layer is switched to be opposite a magnetization direction of the main pole.

13. A magnetic recording device, comprising:
   a main pole having a first surface adjacent to a trailing gap, a second surface adjacent to the first surface and a first side gap, and a third surface opposite the second surface adjacent to a second side gap; and
   a side shield comprising a first layer surrounding surfaces of the main pole consisting of the first surface, the second surface, and the third surface, and a second layer surrounding surfaces of the main pole consisting of the second surface and the third surface, wherein:
      the first surface is disposed adjacent to the trailing gap and the first and second side gaps,
      the second layer is disposed in contact with the first layer, and when a bias current is applied to the first layer, a magnetization direction of the second layer is switched to be opposite a magnetization direction of the main pole.

14. The magnetic recording device of claim 13, wherein the first layer comprises beta phase tungsten (β-W), Pt, or beta phase tantalum (β-Ta), and wherein the second layer comprises CoFe, Coir, NiFe, or a CoFeX alloy, where X=B, Ta, Re, or Ir.

15. The magnetic recording device of claim 13, wherein the first layer has a thickness between about 1 nm to about 9 nm, and the second layer has a thickness between about 2 nm to about 10 nm.

16. The magnetic recording device of claim 13, further comprising:
   a trailing shield disposed adjacent to the trailing gap; and
   an energy assisted-magnetic recording stack disposed between the main pole and the trailing shield.

17. The magnetic recording device of claim 16, wherein a portion of the first layer functions as a layer of the energy assisted-magnetic recording stack.

18. The magnetic recording device of claim 16, further comprising a hot seed layer disposed between the trailing shield and the trailing gap, wherein the hot seed layer comprises a high moment material.

19. The magnetic recording device of claim 18, wherein the high moment material comprises CoFeN or FeXN, where X includes at least one of Rh, Al, Ta, Zr, and Ti.

20. A data storage device comprising the magnetic recording device of claim 13.

* * * * *